(12) United States Patent
Liu et al.

(10) Patent No.: US 11,039,492 B2
(45) Date of Patent: Jun. 15, 2021

(54) DATA RECEIVING MODE CONFIGURATION FOR DUAL CONNECTIVITY COMMUNICATION

(71) Applicant: Telefonaktiebolaget LM Ericsson (publ), Stockholm (SE)

(72) Inventors: Jinhua Liu, Beijing (CN); Rui Fan, Beijing (CN); Shaohua Li, Beijing (CN)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 255 days.

(21) Appl. No.: 16/305,112

(22) PCT Filed: Jul. 7, 2016

(86) PCT No.: PCT/CN2016/089084
§ 371 (c)(1),
(2) Date: Nov. 28, 2018

(87) PCT Pub. No.: WO2018/006312
PCT Pub. Date: Jan. 11, 2018

(65) Prior Publication Data
US 2020/0329518 A1 Oct. 15, 2020

(51) Int. Cl.
*H04W 76/15* (2018.01)
*H04L 1/18* (2006.01)
(Continued)

(52) U.S. Cl.
CPC .......... *H04W 76/15* (2018.02); *H04L 1/1819* (2013.01); *H04W 8/24* (2013.01); *H04W 24/10* (2013.01); *H04W 28/0268* (2013.01)

(58) Field of Classification Search
CPC ....... H04W 76/15; H04W 8/24; H04W 24/10; H04W 28/0268; H04W 72/087;
(Continued)

(56) References Cited

U.S. PATENT DOCUMENTS

| 2014/0335882 | A1 | 11/2014 | Lee et al. |
| 2015/0327280 | A1 | 11/2015 | Zhang et al. |
| 2016/0192379 | A1* | 6/2016 | Behravan ............... H04L 5/001 370/329 |

FOREIGN PATENT DOCUMENTS

| WO | 2016064654 A1 | 4/2016 |
| WO | 2016080899 A1 | 5/2016 |

OTHER PUBLICATIONS

Ravanshid, Azad, et al. "Multi-connectivity functional architectures in 5G." 2016 IEEE international conference on communications workshops (ICC). IEEE, 2016. (Year: 2016).*

(Continued)

*Primary Examiner* — Sharad Rampuria
(74) *Attorney, Agent, or Firm* — Patent Portfolio Builders, PLLC (57) ABSTRACT

The embodiments disclose a method in a primary access node of a wireless network for an intra-carrier dual connectivity communication, the method comprises the steps of determining a data receiving mode based on one or more mode determination parameters, sending information about the determined data receiving mode to a secondary access node and a wireless device and sending data according to the determined data receiving mode to a wireless device. The embodiments also disclose a method in a wireless device connected to a wireless network for an intra-carrier dual connectivity, and the method comprises the steps of receiving information about a data receiving mode from a primary access node and receiving data according to the data receiving mode. According to one or more aspects of the present disclosure, there are provided corresponding access nodes and wireless device.

19 Claims, 7 Drawing Sheets

(51) Int. Cl.
*H04W 8/24* (2009.01)
*H04W 24/10* (2009.01)
*H04W 28/02* (2009.01)

(58) Field of Classification Search
CPC . H04W 72/0426; H04W 72/04; H04W 72/12; H04W 76/00; H04L 1/1819; H04B 7/022; H04B 7/2121; H04B 7/2123; H04J 2203/0069; H04Q 2213/394
See application file for complete search history.

(56) References Cited

OTHER PUBLICATIONS

Ahmad, Syed Amaar, and Luiz A. DaSilva. "Power control and soft topology adaptations in multihop cellular networks with multi-point connectivity." IEEE Transactions on Communications 63.3 (2015): 683-694. (Year: 2015).*

* cited by examiner

DATA RECEIVING MODE CONFIGURATION FOR DUAL CONNECTIVITY COMMUNICATION

TECHNICAL FIELD

The present disclosure generally relates to methods for configuring a data receiving mode for dual connectivity communications in wireless networks and access nodes and wireless device thereof.

BACKGROUND

To improve user experience in cell edge and enhance resource utilization efficiency of wireless networks, a dual connectivity technology is introduced by setting up radio connections with more than one access node for one wireless device. In a dual connectivity wireless network, there are generally two access nodes serving one same wireless device, i.e., a primary access node and a secondary access node, where a radio connection between the primary access node and the wireless device is referred to as a primary access node connection, while a radio connection between the secondary access node and the wireless device is referred to as a secondary access node connection.

There are two types of dual connectivity communications. One type relates to inter-carrier dual connectivity communication, where the primary access node connection and the access node connection are operating over different frequency carriers; therefore, there is interference between the two connections. In this respect, the term "carrier" may denote a certain frequency of frequency band, i.e. multiple frequencies. The other type of dual connectivity communication is intra-carrier connectivity, where the primary access node connection and the secondary access node connection are operating over the same frequency carrier. Compared to the inter-carrier dual connectivity communication, the intra-carrier dual connectivity communication does not need a dual-carrier network and it does not require a dual carrier support in wireless communication device side. Moreover, in view of frequency reuse efficiency, it is more advantageous for intra-carrier dual connectivity communication than the inter-carrier connectivity communication.

In intra-carrier connectivity communication networks, if there exists a non-ideal backhaul or a non-ideal synchronization in an air interface between the primary access node and the secondary access node, then a joint downlink transmission from the primary access node and the secondary access node for the wireless device is not available, since there will be severe interference between the primary access node connection and the secondary access node connection, imposing negative impacts on a communication quality for the wireless device.

SUMMARY

It is an object of the present invention to provide measures with which a transmission performance of the wireless network and the data receiving performance of the wireless device, e.g. with regard to interference and the capability of the wireless device, and thereby a user experience can be enhanced despite varying conditions of the wireless network and the wireless device.

Due to different network and wireless device conditions, a fixed downlink data receiving mode may not be desirable for intra-carrier connectivity communication networks. In this disclosure, a method for configuring a data receiving mode for an intra-carrier communication network is presented. Generally, the downlink data receiving mode is determined from different data receiving modes, i.e., Time Divided Receiving (TDR) mode, Frequency Divided Receiving (FDR) mode and Simultaneous Data Receiving (SDR) mode, according to one or more mode determination parameters. The mode determination parameters include at least one of the following factors: a capability of the wireless device, a timing difference between the primary access node connection and the secondary access node connection, a Quality of Service (QoS) requirement for the wireless device, radio qualities of the primary access node connection and the secondary access node connection, battery life status of the wireless device, and Hybrid Automatic Repeat Request (HARQ) feedbacks of the primary access node connection and secondary access node connection.

According to one embodiment of the disclosure, there is provided a method in a primary access node of a wireless network for configuring a data receiving mode for an intra-carrier dual connectivity communication. The method comprises a step of determining a data receiving mode based on one or more mode determination parameters, a step of sending information about the determined data receiving mode to a secondary access node and a wireless device, and a step of sending data according to the determined data receiving mode to a wireless device.

According to another embodiment of the disclosure, there is provided another method in a primary access node of a wireless network for configuring a data receiving mode for an intra-carrier dual connectivity communication. The method comprises a step of configuring a simultaneous data receiving, SDR, mode as a data receiving mode, a step of sending information about the configured SDR mode to a secondary access node and a wireless device, and a step of sending data according to the configured SDR mode to the wireless device. In the SDR mode, transmission resources scheduled by the primary access node and the secondary access node are overlapping or separate in a frequency domain and/or a time domain.

According to a further embodiment of the disclosure, the method in the primary access node further comprises a step of sending a measurement configuration to the secondary access node and the wireless device, and a step of receiving measurement reports from the secondary node and the wireless device, and the measurement reports comprise one or more mode determination parameters.

According to another embodiment of the disclosure, there is provided a method in a secondary access node of a wireless network for an intra-carrier dual connectivity communication. The method comprises a step of receiving information about a data receiving mode from a primary access node, and step of sending data according to the data receiving mode to a wireless device.

According to a further embodiment of the disclosure, the method in the secondary access node further comprises a step of receiving a measurement configuration from a primary access node and a step of sending a measurement report to the primary access node, and the measurement report comprises one or more mode determination parameters.

According to a further embodiment of the disclosure, the data receiving mode is one of the following three modes: TDR mode, where transmission resources scheduled by the primary access node and the secondary access node are separate in a time domain, FDR mode, where the transmission resource scheduled by the primary access node and the secondary access node are separate in a frequency domain, and SDR mode, where the transmission resources scheduled by the primary access node and the secondary access node are overlapping or separate in a frequency domain and/or a time domain.

According to another embodiment of the disclosure, there is provided
a method in a wireless device connected to a wireless network for an intra-carrier dual connectivity communication, and the method comprises a step of receiving information about a data receiving mode from a primary access node, and a step of receiving data according to the data receiving mode.

According to a further embodiment of the disclosure, the method in the wireless device further comprises a step of receiving a measurement configuration from the primary access node, and a step of sending a measurement report to the primary access node.

According to a further embodiment of the disclosure, the one or more mode determination parameters comprise parameters relating to a capability of the wireless device.

According to a further embodiment of the disclosure, the one or more mode determination parameters comprise parameters relating to a timing difference between the primary access node connection and the secondary access node connection.

According to a further embodiment of the disclosure, the one or more mode determination parameters comprise parameters relating to a QoS requirement of the wireless device.

According to a further embodiment of the disclosure, the one or more mode determination parameters comprise parameters relating to a radio quality of the primary access node connection and a radio quality of the secondary access node connection.

According to a further embodiment of the disclosure, the one or more mode determination parameters comprise parameters relating to a battery life status of the wireless device.

According to a further embodiment of the disclosure, the one or more mode determination parameters comprise parameters relating to a HARQ feedback of the primary access node connection and a HARQ feedback of the secondary access node connection.

According to another embodiment of the disclosure, there is provided a primary access node for a wireless network, and the primary access node comprises a mode determination module for determining a data receiving mode based on one or more mode determination parameters, a mode information sending module for sending information about the determined data receiving mode to a secondary access node and a wireless device, and a data sending module for sending data according to the determined data receiving mode to a wireless device.

According to another embodiment of the disclosure, there is provided a primary access node for a wireless network, and the primary access node comprises a SDR mode configuration module for configuring a SDR mode as a data receiving mode, a SDR mode information sending module for sending information about the configured SDR mode to a secondary access node and a wireless device, and a data sending module for sending data according to the configured SDR mode to a wireless device.

According to a further embodiment of the disclosure, the primary access node further comprises a measurement configuration sending module for sending a measurement configuration to the secondary access node and the wireless device, and a measurement report receiving module for receiving measurement reports from the secondary node and the wireless device, where the measurement reports comprise one or more mode determination parameters.

According to another embodiment of the disclosure, there is provided a secondary access node for a wireless network, and the secondary access node comprises a mode information receiving module for receiving information about a data receiving mode from a primary access node, and
a data sending module for sending data according to the data receiving mode to a wireless device.

According to a further embodiment of the disclosure, the secondary access node further comprises a measurement configuration receiving module for receiving a measurement configuration from a primary access node, and a measurement report sending module for sending a measurement report to the primary access node, where the measurement report comprises one or more mode determination parameters.

Details of the above embodiments and further embodiments will be apparent from the following detailed description of embodiments.

BRIEF DESCRIPTION OF THE DRAWINGS

Exemplary features of the present invention are set forth in the appended claims. However, the present invention, its implementation mode, other objectives, features and advantages will be better understood through reading the following detailed description on the exemplary embodiments with reference to the accompanying drawings, where in the drawings:

DETAILED DESCRIPTION OF EMBODIMENTS

Embodiments herein will be described in detail hereinafter with reference to the accompanying drawings, in which embodiments are shown. These embodiments herein may, however, be embodied in many different forms and should not be construed as being limited to the embodiments set forth herein. The elements of the drawings are not necessarily to scale relative to each other. Like numbers refer to like elements throughout.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meanings as commonly understood. It will be further understood that a term used herein should be interpreted as having a meaning consistent with its meaning in the context of this specification and the relevant art and will not be interpreted in an idealized or overly formal sense unless expressly so defined herein.

The present disclosure is described below with reference to block diagrams and/or flowchart illustrations of methods, nodes, devices (systems) and/or computer program products according to the present embodiments. It is understood that blocks of the block diagrams and/or flowchart illustrations, and combinations of blocks in the block diagrams and/or flowchart illustrations, may be implemented by computer program instructions. These computer program instructions may be provided to a processor, controller or controlling unit of a general purpose computer, special purpose computer, and/or other programmable data processing apparatus to produce a machine, such that the instructions, which execute via the processor of the computer and/or other programmable data processing apparatus, create means for implementing the functions/acts specified in the block diagrams and/or flowchart block or blocks.

Accordingly, the present technology may be embodied in hardware and/or in software (including firmware, resident software, micro-code, etc.). Furthermore, the present technology may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that may contain, store, communicate, propagate, or transport the program for use by or in connection with the instruction execution system, apparatus, or device.

Figure 1:
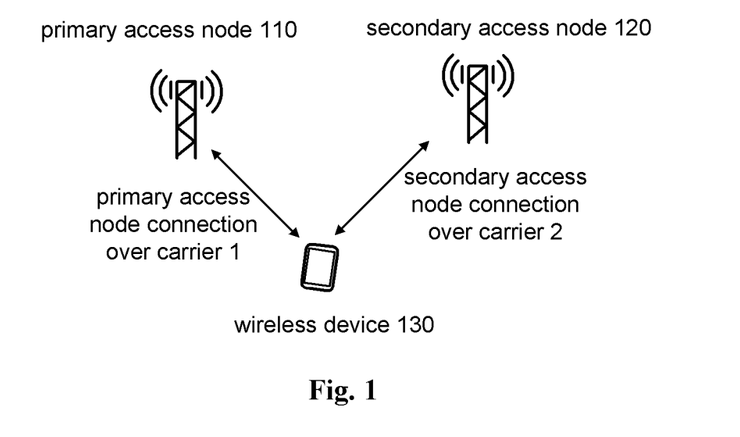
FIG. 1 schematically shows an exemplary system setup for inter-carrier dual connectivity communication network.

FIG. 1 shows an exemplary system setup for inter-carrier dual connectivity communication network. There are two access nodes serving a wireless device, i.e., a primary access node and a secondary access node. The connection between the primary access node and the wireless device is referred to as a primary access node connection, which is operating over carrier 1, while the connection between the secondary access node and the wireless device is referred to as a secondary access node connection, which is operating over carrier 2. It should be mentioned that there is no overlap between the frequency band of carrier 1 and carrier 2 in the frequency domain; therefore there is no interference between the connections. However, the inter-carrier dual connectivity system setup requires at least dual carriers in the wireless networks, which leads to a low frequency reuse efficiency. Moreover, it also needs a dual carrier support capability in the wireless device side. To overcome the abovementioned disadvantages, the intra-carrier dual connectivity communication network is discussed in the present disclosure.

Figure 2:
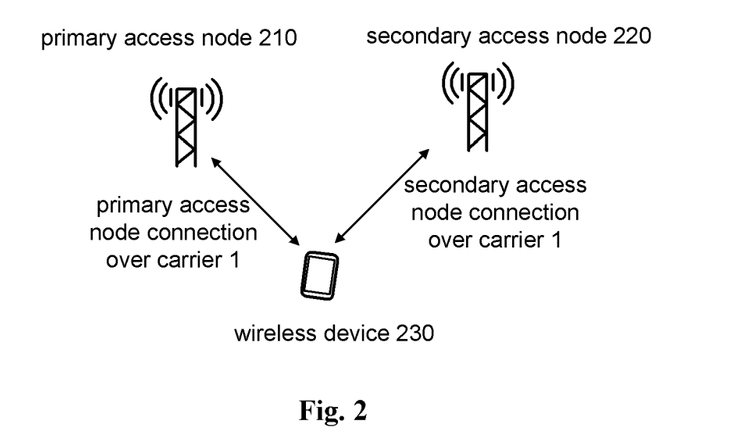
FIG. 2 schematically shows an exemplary system setup for intra-carrier dual connectivity communication network according to one or more embodiments of the present invention.

FIG. 2 shows an exemplary system setup for intra-carrier dual connectivity communication network according to one or more embodiments of the disclosure. As illustrated, the primary access node connection and the secondary access node connection are operating over the same carrier, i.e., carrier 1. Therefore the frequency reuse factor of intra-carrier dual connectivity communication network could be 1, which means the frequency reuse efficiency of intra-carrier dual connectivity communication network is higher than the one of inter-carrier dual connectivity communication network.

It should be appreciated by the skilled in the art that the primary access node connection and the secondary access node connection could be implemented with an Orthogonal Frequency Division Multiplexing (OFDM) in LTE/LTE-A system, and the two connections could be also implemented with a Non-orthogonal Multiple Access (NOMA) in the fifth generation communication system, without departing the spirit and teaching of the disclosure.

For example in case of LTE being used for the primary access node connection and the secondary access node connection, a backhaul interface between the primary access node and the secondary access node, can be the X2 interface of LTE, through which system configuration and control signaling for the dual connectivity network could be exchanged, such that the primary access node and the secondary access node could serve the wireless devices cooperatively. In view of a typical system setup for dual connectivity communication system in such a case, the primary access node may be responsible for the overall control of the dual connectivity communication configuration and adaption through different signalling to the secondary access node and the wireless devices, such as Radio Resource Control (RRC) signalling, Radio Link Layer Control (RLC) signalling Media Access Control (MAC) signalling (e.g. MAC control element (CE) signalling), physical layer signalling, e.g., Downlink Control Indicator (DCI) on Physical Downlink Control Channel (PDCCH) or X2 signaling in LTE systems. The secondary access node may perform X2 signalling, RLC signalling, MAC (CE) signalling and physical layer signalling for this wireless device.

As discussed above, as the primary access node connection and the secondary access node connection are operating over the same carrier, the inter-connection interference should be considered if joint transmission is not available due to certain restrictions, for instance, the non-ideal backhaul between the primary access node and the secondary access node, the non-ideal synchronization between the primary access node and the secondary access node. Three data receiving modes for downlink data transmission in intra-carrier dual connectivity communication are proposed in this disclosure, i.e., TDR mode, FDR mode and SDR mode which utilization may reduce such inter-connection interference. In this respect, the term "data receiving mode" may particularly denote a reception mode of an entity, e.g. the wireless device, which may receive the downlink transmission sent by one or two respective peer entities, e.g. the primary access node and/or the secondary access node.

Figure 3:
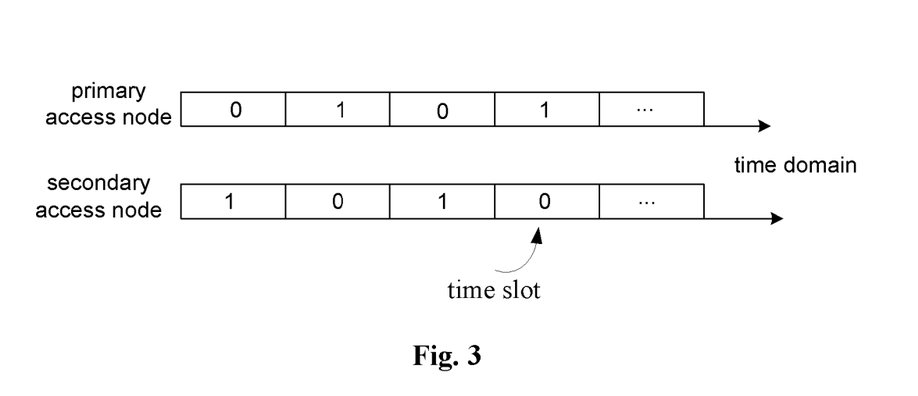
FIG. 3 schematically illustrates an exemplary TDR mode for intra-carrier dual connectivity communication according to one or more embodiments of the present invention.

FIG. 3 schematically illustrates an exemplary TDR mode for intra-carrier dual connectivity communication according to one or more embodiments. For a TDR mode, a transmission resource scheduled by the primary access node and a transmission resource of the secondary access node are separate in a time domain, such that only one access node sends data to the wireless device in a given time slot and there is no interference between the primary access node connection and the secondary access node connection. It should be mentioned that the data may corresponds to the payload data in this disclosure. As illustrated in FIG. 3, "1" in a certain time slot corresponding to a certain access node represents that the access node is sending data to the wireless device in this time slot, while "0" in a certain time slot corresponding to a certain access node represents that the certain access node is not sending data to the wireless device in this time slot. For each time slot, only one access node, e.g., either the primary access node or the secondary access node, is communicating with the wireless device according to a TDR transmission pattern. This pattern could be predefined or sent to the wireless device by the primary access node so that the wireless device could determine when to monitor the data from which access node. It is noted that the term "transmission resource" may denote throughout this disclosure one or more physical transmission resources, e.g. physical resource blocks PRBs or resource elements RE, both known from LTE. Such physical resource or resources may span over time and frequency. For example, the "transmission resource" may cover one or resource units in the time domain and/or a part or a complete frequency width of the carrier.

Figure 4:
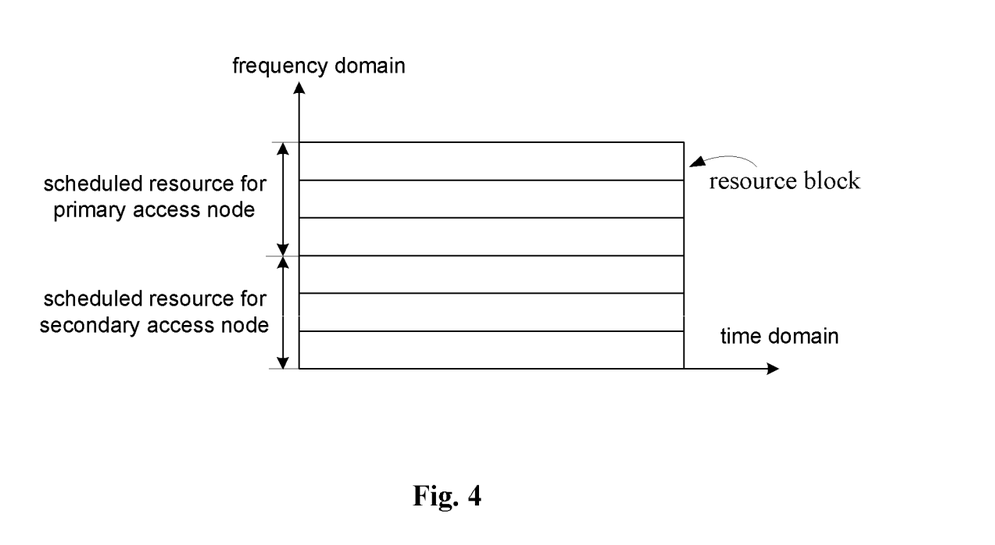
FIG. 4 schematically illustrates an exemplary FDR mode for intra-carrier dual connectivity communication according to one or more embodiments of the present invention.

FIG. 4 schematically illustrates an exemplary FDR mode for intra-carrier dual connectivity communication according to one or more embodiments. For a FDR mode, a transmission resource scheduled by the primary access node and a transmission resource of the secondary access node are separate in a frequency domain, as illustrated in FIG. 4. Since there is no overlapping between the scheduled resource blocks by the primary access node and the scheduled resource blocks by the secondary access node in the frequency domain, no interference will be introduced in the FDR mode for intra-carrier dual connectivity network. As it is shown in FIG. 4, the transmission resource of the primary access node and of the secondary access node may extend over the time domain and cover three PRBs.

Another data receiving mode in the intra-carrier dual connectivity communication is the SDR mode. In this mode, the transmission resource scheduled by the primary access node and the transmission resource of the secondary access node are overlapping or separate in a frequency domain and/or a time domain, which means both the primary access node and secondary access node could freely schedule the respective downlink transmission resource, resulting in possible interference between the primary access node connection and the secondary access node connection. In a SDR mode, the wireless device could handle the possible interference by using advanced receivers, for example, a Network Assisted Interference Cancellation (NAIC) receiver, a Parallel Interference Cancellation (PIC) receiver or a Serial Interference Cancellation (SIC) receiver. Therefore, the wireless device could decode the data from both connections irrespectively of the fact that the data transmissions from the two access nodes are scheduled over a different or a same time and frequency resource.

For an intra-carrier dual connectivity communication network, a fixed downlink data receiving mode may not be advantageous. For instance, if a TDR mode is applied for all wireless devices in all network conditions, the inter-connection interference for one wireless device can be controlled but the wireless device can only obtain half scheduling opportunity for each connection, which will impose negative impact on data throughput. However, if a SDR mode is always applied, the scheduling opportunity for each connection can be guaranteed but it requires that the radio condition always meet certain requirements. For instance, a signal quality from one connection could be better than the other connection so that the wireless device can decode the signal from the connection with better signal quality first when a NAIC receiver, a PIC receiver, or a SIC receiver is equipped for the wireless device. Similarly, a FDR mode may restrict the frequency resource allocation for each connection which results in a data rate reduction for the wireless device. In this disclosure, it is desirable that the downlink data receiving mode could be configured according to one or more mode determination parameters to adapt to different network conditions and service requirements for the wireless device.

Figure 5:
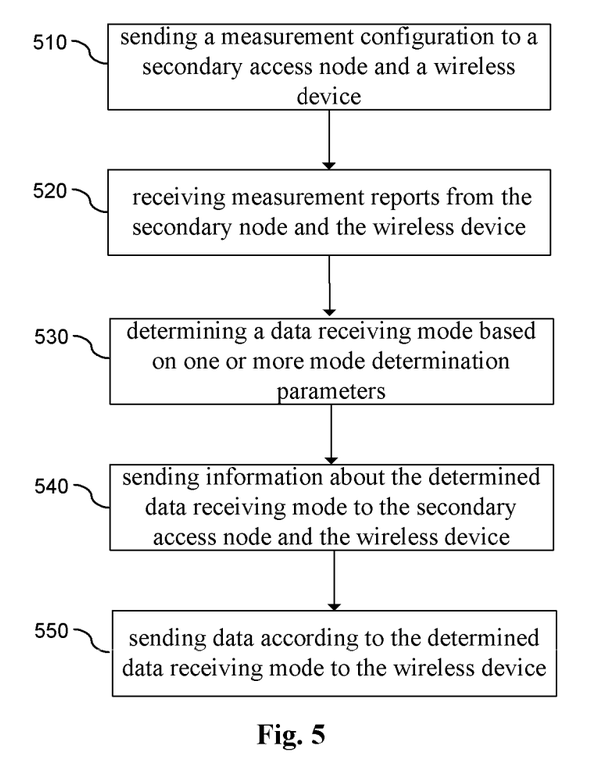
FIG. 5 shows a flowchart for illustrating a method in a primary access node of a wireless network for configuring a data receiving mode for an intra-carrier dual connectivity communication according to one or more embodiments of the present invention.

FIG. 5 shows a flowchart for illustrating a method in a primary access node of a wireless network for configuring a data receiving mode for an intra-carrier dual connectivity communication according to one or more embodiments of the disclosure.

At step 510, the primary access node sends a measurement configuration to the secondary access node and the wireless device in order to obtain one or more mode determination parameters for selection of a data receiving mode. It should be mentioned that the measurement configuration could be sent by signaling to the secondary access node and the wireless device, e.g., RRC signaling, MAC (CE) signaling, physical layer signaling, or X2 signaling. It could be appreciated by the skilled in the art that the measurement configuration could be predefined for the secondary access node and the wireless device, and it could be also changed dynamically or periodically according to different network configurations or application scenarios.

At step 520, the primary access node receives measurement reports from the secondary node and the wireless device. The mode determination parameters could be derived from the measurement reports, which could be further used by the primary access node to determine the data receiving mode. The mode determination parameters include at least one of the followings: a capability of the wireless device, a timing difference between the primary access node connection and the secondary access node connection, a QoS requirement for the wireless device, radio qualities of the primary access node connection and the secondary access node connection, battery life status of the wireless device, and HARQ feedbacks of the primary access node connection and secondary access node connection.

At step 530, the primary access node determines a data receiving mode based on the one or more mode determination parameters. In one example, the mode determination parameters relating to a capability of the wireless device may indicate which downlink data receiving mode(s) that the wireless device can support. For an advanced wireless device, the parameters as to capability may indicate that the wireless device supports SDR mode, based on which the primary access node could determine the data receiving mode as the SDR mode for example. For some wireless device, the parameters as to capability may indicate the wireless device supports FDR or TDR, which means it is possible for the primary access node to determine the data receiving mode as FDR or TDR mode for example, while for other wireless devices, the parameters as to capability may indicate these wireless devices do not support dual connectivity at all.

In another example, the mode determination parameters relating to a capability of the wireless device may indicate a number of Physical Resource Blocks (PRB) and/or a number of component carriers can be supported for a SDR mode for given frequency band combinations and/or antenna layer configuration for Multiple Input and Multiple Output (MIMO) communication.

In still another example, the mode determination parameters relating to a capability of the wireless device may explicitly or implicitly link to the capability of the wireless device for other functionalities. For instance, when the capability of the wireless device indicates the wireless device can perform inter-cell interference cancellation, the primary access node can determine that this wireless device can support the SDR mode. The wireless device could report the capability of interference cancellation at the setup for the secondary access node connection. Such a wireless device capable of performing inter-cell interference cancellation can handle the signal from the primary access node connection as well as the signal from the secondary access node connection in the same time and frequency resource block, which means the wireless device could support the SDR mode. For this wireless device, the network can further determine whether to configure the data receiving mode as the SDR mode for this wireless device according to other metrics mentioned below.

In still another example, when the wireless device capability indicates the wireless device can support multiple component carriers, and if the processing capability of dual connectivity is less than the processing capability required by the support of multiple component carriers, the primary access node can determine the wireless device can support the SDR mode. For instance, if the wireless device indicates that the wireless device supports two component carriers and each component carrier is 20 MHz bandwidth, the primary access node can determine the wireless device can support the SDR for one downlink component carrier with 20 MHz bandwidth, which means that the primary access node determines the SDR mode for the data receiving mode of the wireless device for example.

In still another example, the mode determination parameters relate to a timing difference between the primary access node connection and the secondary access node connection. When both primary access node and the secondary access node sends data to the wireless device in the same time slot, such as the Transmission Time Interval (TTI) in 3GPP communication systems, there may be a timing difference for the two signal arrivals at the wireless device from the primary access node and the secondary access node. For SDR mode and FDR mode, it is required that the timing difference of the signal arrivals from the two access node connections shall be within a Cyclic Prefix (CP) duration such that the wireless device is capable of decoding the OFDM symbol correctly. Therefore, if the timing difference for the two signal arrivals from the primary access node and the secondary access node is within a CP duration, other parameters may be further considered to distinguish the data receiving mode between SDR and FDR. Otherwise, if this condition is not fulfilled, only TDM mode can be configured by the primary access node in the wireless device.

In still another example, the mode determination parameters relate to radio qualities for the primary access node connection and the secondary access node connection, e.g. Reference Signal Receiving Power (RSRP), Reference Signal Receiving Quality (RSRQ), Received Signal Strength Indication (RSSI), Channel Quality Indicator (CQI), Signal to Noise Ratio (SNR), or Signal to Interference plus Noise Ratio (SINR). The wireless device can be configured to report the radio qualities of both the primary access node connection and the secondary access node connection. If the radio quality difference between the two connections is larger than a certain threshold and the weaker connection is still better than another threshold, then a SDR mode can be configured by the primary access node. In a SDR mode, the wireless device can decode the data from the stronger connection with higher radio quality first; then the wireless device cancels the interference of the stronger connection from the total received signal of both connections and decodes the data of the other connection, i.e., the weaker connection. Such a decoding process can be enabled by the above described advanced receivers.

In still another example, the mode determination parameters relate to the QoS requirement set for the wireless device. Different services may require different requirements on packet delay, and loss rate. Different data receiving modes may include different characteristics with respect to these aspects. For instance, Vehicle to Vehicle (V2V) traffic requires low delay and low packet loss, thus a FDR mode and a TDR mode may be preferred since inter-connection interference are avoided in this case. However, for File Transfer Protocol (FTP) application, video and web surfing traffic, a higher data rate shall be required and therefore the SDR mode could be preferred when the timing difference, radio quality and wireless device capability conditions are fulfilled.

In still another example, the mode determination parameters relate to a battery life status of a battery of the wireless device. For example, if the battery life of the wireless device is lower than a certain threshold, the wireless device could send a measurement report relating to the battery life status to the primary access node. The primary access node could configure the wireless device as TDR mode to save the battery power and avoid performing data decoding over the both connections in parallel.

In still another example, the mode determination parameters relate to the HARQ feedback. When a FDR or SDR mode is configured and if the Negative Acknowledgment (NACK) ratio difference between two connections is larger than a predefined threshold, which means the FDR or SDR mode is not preferred in this condition and TDR can be configured for this wireless device to improve the communication qualities.

In practice, the aforementioned mode determination rules can be jointed or separately employed by the primary access node for the determination of the downlink data receiving mode to be employed in the wireless device. The downlink data receiving mode could be switched among the three data receiving modes according to different mode determination parameters. For example, a TDR mode can be determined by default, since there is no strict requirement on radio conditions for the TDR mode. In another example, if a timing difference between two connections is within one CP and a wireless device supports FDR capability, then the wireless device can be configured in the FDR mode. In still another example, a SDR mode could be configured if a wireless device supports NAIC, and a timing difference between the two connections is within one CP, and a radio quality difference between two connections is larger than a threshold and the radio quality of the weaker connection is better than another threshold, and the service requires high data rate and/or low delay. In still another example, if a wireless device only requires low data rate, the primary access node could configure a TDR mode even if the conditions for FDR or SDR mode are fulfilled in order to save the battery power of the wireless device. In still another example, a SDR mode could be configured if an aggregated bandwidth of the two connections is less than the maximum supported bandwidth indicated by a capability of the wireless device, and if a timing difference between the two connections in the same TTI is within one CP and if the radio quality difference between the two connections is larger than a certain threshold, and if the radio quality of the weaker connection is better than another threshold, and if the service requires high data rate and/or low delay, which means that all the previously mentioned conditions have to be fulfilled in parallel, so the SDR mode could be configured.

It should be mentioned that the aforementioned mode determination rules are illustrated only for an exemplary purpose. Different combinations, modifications and/or variations with respect to the examples and embodiments illustrated in this disclosure could be obtained by the skilled in the art according to the teachings in this disclosure. It should be also noted that it is desirable for the person skilled in the art to implement different mode determination rules according to different network configurations and application requirements without departing from the spirit and scope of the disclosure.

At step 540, the primary access node sends information about the determined data receiving mode to the secondary access node and a wireless device by signaling, such as the X2 signaling between the primary access node and the secondary access node, RRC signaling, MAC (CE) signaling or physical layer signaling, e.g., DCI on PDCCH. At step 550, the primary access node sends data according to the determined data receiving mode to a wireless device. The resources in the frequency and/or time domain scheduled by the primary access node and secondary access node could be determined according to the properties of the selected different data receiving modes, e.g., TDR, FDR and SDR mode as discussed above.

It should be appreciated by the person skilled in the art that the one or more mode determination parameters could be obtained by the other mechanisms than the measurement configuration and report as aforementioned. For example, the primary access node could measure and/or derive some mode determination parameters by itself, based on which it can determine which data receiving mode should be applied for certain system setups and application scenarios. Therefore, the steps of 510 and 520 are optional features and may represent preferable implementations according to some embodiments. It should be also noted that any modification, equivalent change, and/or variation could be implemented by the skilled in the art without departing the spirit and teaching of this disclosure.

In the present disclosure, wireless devices also known as mobile terminals, wireless terminals and/or User Equipment (UE) are enabled to communicate wirelessly with an access node in a wireless communication network, sometimes also referred to as a cellular radio system. For instance, a communication device may be, but is not limited to: mobile phone, smart phone, sensor device, meter, vehicle, household appliance, medical appliance, media player, camera, or any type of consumer electronic, for instance, but not limited to, television, radio, lighting arrangement, tablet computer, laptop, or Personal Computer (PC). The wireless device may be a portable, pocket-storable, hand-held, computer-comprised, or vehicle-mounted mobile device, enabled to communicate voice and/or data, via a wireless or wired connection.

Typically, an access node may serve or cover one or several cells of the wireless communication system. That is, the access node provides radio coverage in the cell(s) and communicates over an air interface with wireless devices operating on radio frequencies within its range. The access node in some wireless communication systems may be also referred to as "eNB", "eNodeB", "NodeB" or "B node" for example, depending on the technology and terminology used. In the present disclosure, the access node may also be referred to as a Base Station (BS). The access node may be of different classes such as e.g. macro eNodeB, home eNodeB or pico base station, or relay node in heterogeneous or homogeneous networks, based on transmission power and thereby also cell size.

Figure 6:
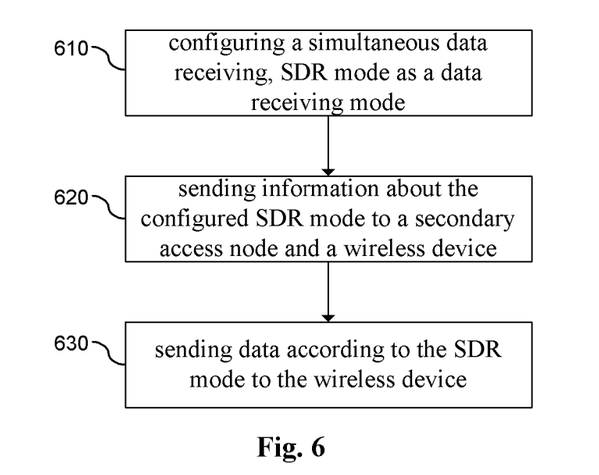
FIG. 6 shows a flowchart for illustrating a method in a primary access node of a wireless network for configuring a data receiving mode for an intra-carrier dual connectivity communication according to one or more embodiments of the present invention.

FIG. 6 shows a flowchart for illustrating a method in a primary access node of a wireless network for configuring a data receiving mode for an intra-carrier dual connectivity communication according to one or more embodiments.

At step 610, the primary access node configures a SDR mode as a data receiving mode for a wireless communication device, when the SDR mode is supported by the wireless device. At step 620, the primary access node sends information about the configured SDR mode to a secondary access node and a wireless device by signaling, such as X2 signaling, RRC signaling, MAC control element signaling and/or physical layer signaling. At step 630, the primary access node sends data according to the SDR mode to a wireless device.

In this embodiment, for example the SDR mode is configured by default in order to maximize the frequency efficiency for the intra-carrier dual connectivity communication, when the wireless device supports SDR mode. However, it should be mentioned that the primary access node could reconfigure or adaptively change the data receiving mode according to one or more mode determination parameters, which means the primary access node could switch to FDR mode or TDR mode in certain conditions according to different mode determination rules mentioned above.

Figure 7:
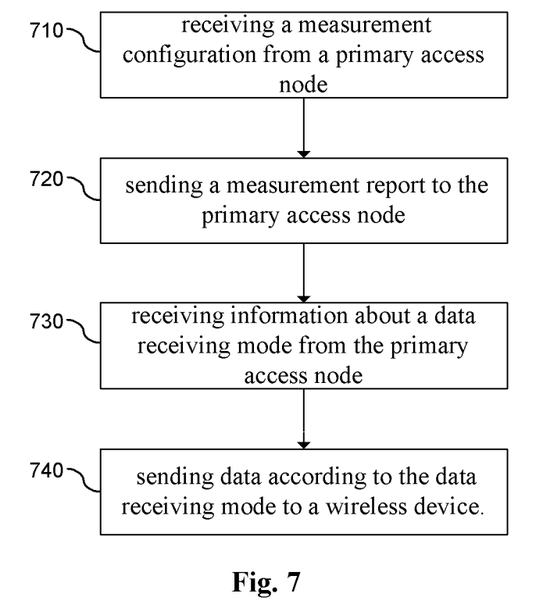
FIG. 7 shows a flowchart for illustrating a method in a secondary access node of a wireless network for an intra-carrier dual connectivity communication according to one or more embodiments of the present invention.

FIG. 7 shows a flowchart for illustrating a method in a secondary access node of a wireless network for an intra-carrier dual connectivity communication according to one or more embodiments.

At step 710, the secondary access node receives a measurement configuration from a primary access node by a signaling from the primary access node, such as X2 signaling in 3GPP LTE systems. At step 720, the secondary access node sends a measurement report to the primary access node. As discussed above, the measurement report comprises different mode determination parameters, which could be utilized by the primary access node to determine which data receiving mode could be determined. At step 730, the secondary access node receives information about a data receiving mode from the primary access node. Based on the information about the data receiving mode, the secondary access node could determine the data transmission configuration and resource scheduled for data transmission to a wireless device. At step 740, the secondary access node sends data according to the data receiving mode to the wireless device.

It should be mentioned that the steps of 710 and 720 are only preferable in certain embodiments, which means a method performed by the secondary access node does not require these two steps in all conditions to be included. I.e. the steps 710 and 720 are optional. As aforementioned, the mode determination parameters could be obtained by the primary access node itself through the primary access node performing a measurement or derivation, therefore, in such network configuration and application scenarios, the primary access node would not configure the secondary access node and the wireless device for sending a measurement report, and thus it is not necessary for the secondary access node to receive the measurement configuration and send the measurement report to the primary access node. It should be also noted that the method may be performed by the secondary access node of the intra-carrier dual connectivity communication network, e.g., a base station in a homogeneous network, a macro node in a heterogeneous network, or a pico node in a heterogeneous network. If a processor-based implementation of the secondary access node is used, the steps of the method may be performed by one or more processors of the access node.

Figure 8:
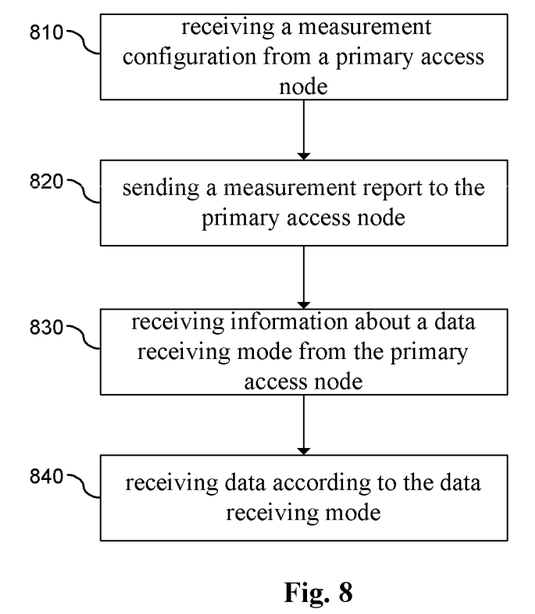
FIG. 8 shows a flowchart for illustrating a method in a wireless device connected to a wireless network for an intra-carrier dual connectivity communication according to one or more embodiments of the present invention.

FIG. 8 shows a flowchart for illustrating a method in a wireless device connected to a wireless network for an intra-carrier dual connectivity communication according to one or more embodiments.

At step 810, the wireless device receives a measurement configuration from a primary access node. Furthermore, the measurement configuration could be received from RRC signaling, MAC (CE) signaling or physical layer signaling from the primary access node.

At step 820, the wireless device sends a measurement report to the primary access node. As discussed above, the measure report comprises at least one of the following parameters: a capability of the wireless device, a timing difference between the primary access node connection and the secondary access node connection, a QoS requirement for the wireless device, radio qualities of the primary access node connection and the secondary access node connection, battery life status of a battery of the wireless device, and HARQ feedbacks of the primary access node connection and secondary access node connection. It should be also noted that the measurement report could be either sent periodically or can be event triggered.

At step 830, the wireless device receives information about a data receiving mode from the primary access node.

At step 840, the wireless device receives data according to the data receiving mode. Based on the information about the data receiving mode received in the step 830 from the primary access node, the wireless device could know how to receive the data sent by the primary access node and/or the secondary access node. For example, if the data receiving mode is TDR mode, the wireless device could obtain the transmission pattern information of TDR mode, as illustrated in FIG. 3 for the primary access node and secondary access node for example, based on which the wireless device could receive the data at the predefined time slot according to the TDR transmission pattern from the primary access node or the secondary access node. In another example, if the data receiving mode is FDR mode, the wireless device could obtain the transmission pattern information of the FDR mode, as illustrated in FIG. 4 for example, based on which the wireless device could receive the data in different scheduled resources in frequency domain from the primary access node or the secondary access node. For still another example, if the data receiving mode is the SDR mode, the wireless device could obtain the transmission information of SDR, based on which the wireless device will employ advanced receivers, such the NAIC, PIC or SCI receivers to decode the data from the resources in the same time and frequency block from the primary access node and the secondary access node.

It should be mentioned that the steps of 810 and 820 are only preferable in certain embodiments, which means a method performed by the wireless device does not require these two steps in all conditions to be included. I.e. the steps 810 and 820 are optional. As aforementioned, for certain cases, the mode determination parameters might be obtained by the primary access node itself through the primary access node performing a measurement or derivation, therefore, in such network configuration and application scenarios, the primary access node would not configure the secondary access node and the wireless device for measurement reports, and thus it is not necessary for the wireless device to receive the measurement configuration and send the measurement report to the primary access node.

Figure 9:
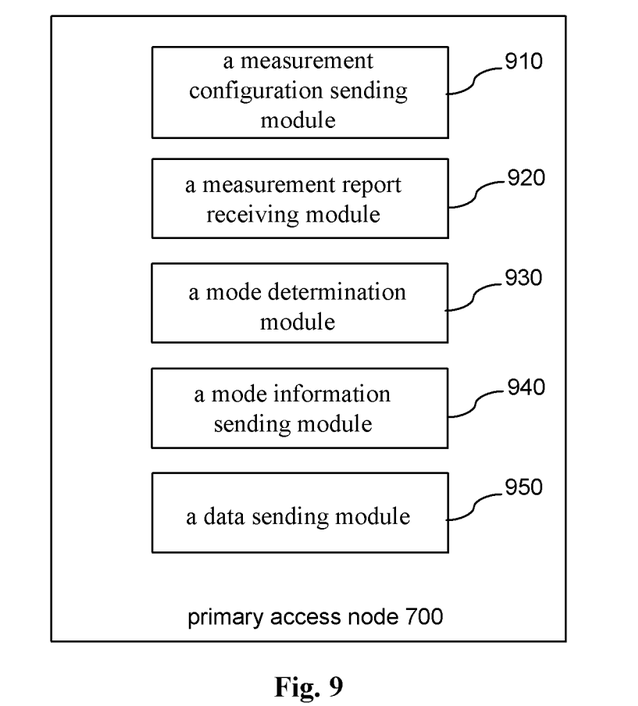
FIG. 9 schematically illustrates a block diagram of a primary access node according to one or more embodiments of the present invention.

FIG. 9 schematically illustrates a block diagram of a primary access node 900 according to one or more embodiments. The primary access node 900 may for example correspond to the primary access node described above in connection with FIGS. 2 to 8. As shown, the primary access node 900 comprises a measurement configuration sending module 910 for sending a measurement configuration to the secondary access node and the wireless device, a measurement report receiving module 920 for receiving measurement reports from the secondary node and the wireless device, a mode determination module 930 for determining a data receiving mode based on one or more mode determination parameters, a mode information sending module 940 for sending information about the determined data receiving mode to a secondary access node and a wireless device, and a data sending module 950 for sending data according to the determined data receiving mode to a wireless device.

It should be mentioned the above modules correspond to the steps of the method described above, and it is appreciated for the person skilled in the art that said modules could be implemented via Programmable Logic Device (PLD), Field Programmable Gate Array (FPGA), Application Specific Integrated Circuit (ASIC), and other implement mechanisms as software products, application specific firmware, hardware products and a combination thereof. It should be also mentioned that as discussed above in FIG. 5, the modules of 910 and 920 are only preferable in some embodiments, which means for certain primary access nodes, there are only module of 930, 940 and 950, since in certain cases the primary access node could obtain the mode determination mode by itself, therefore, the primary access node could only comprise the modules of 930, 940, 950 in such cases.

Figure 10:
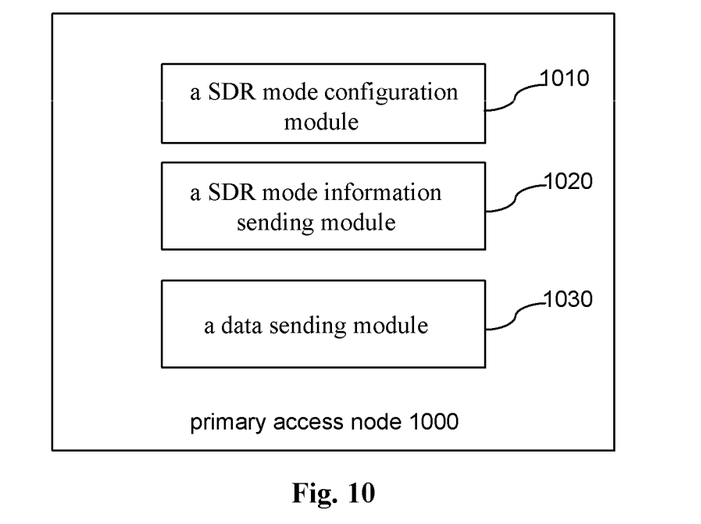
FIG. 10 schematically illustrates a block diagram of another primary access node according to one or more embodiments of the present invention.

FIG. 10 schematically illustrates a block diagram of another primary access node 1000 according to one or more embodiments. This primary access node 1000 may also correspond to the primary access node described above in connection with FIGS. 2 to 8. As illustrated, the primary access node 1000 could comprise a SDR mode configuration module 1010 for configuring a SDR mode as a data receiving mode, a SDR mode information sending module 1020 for sending information about the configured SDR mode to a secondary access node and a wireless device; and a data sending module 1030 for sending data according to the configured SDR mode to a wireless device. It should be mentioned the above modules correspond to the steps of the method described above in FIG. 6, and it is appreciated for the person skilled in the art that said modules could be implemented via PLD, FPGA, ASIC, and other implement mechanisms as software products, application specific firmware, hardware products and a combination thereof.

Figure 11:
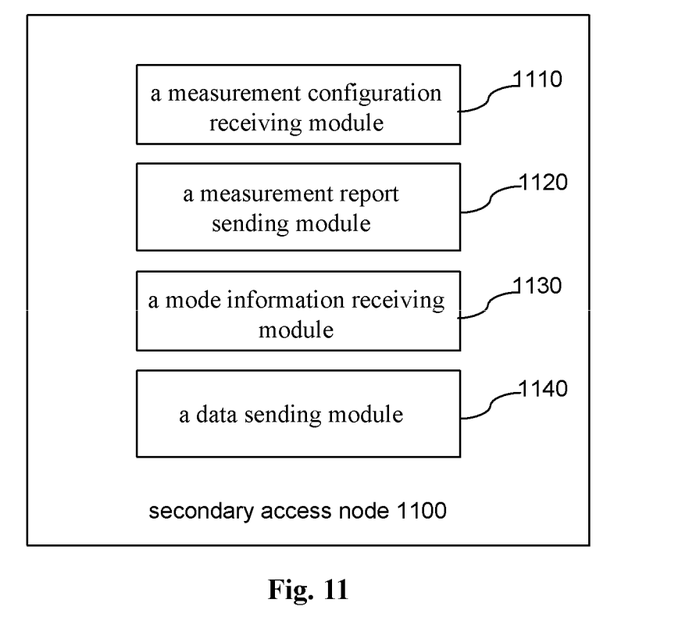
FIG. 11 schematically illustrates a block diagram of a secondary access node according to one or more embodiments of the present invention.

FIG. 11 schematically illustrates a block diagram of a secondary access node 1100 according to one or more. The secondary access node 1100 may correspond to the secondary access node described above in connection with FIGS. 2 to 8. As illustrated, the secondary access node 1100 could comprise a measurement configuration receiving module 1110 for receiving a measurement configuration from a primary access node, a measurement report sending module 1120 for sending a measurement report to the primary access node, a mode information receiving module 1130 for receiving information about a data receiving mode from a primary access node; and a data sending module 1140 for sending data according to the data receiving mode to a wireless device, where the measurement report comprises one or more mode determination parameters. It should be mentioned the above modules correspond to the steps of the method described above, and it is appreciated for the person skilled in the art that said modules could be PLD, FPGA, ASIC, and other implement mechanisms as software products, application specific firmware, hardware products and a combination thereof. It should be also mentioned that as discussed above in FIG. 7, the modules of 1110 and 1120 are only preferable in some embodiments, which means in certain cases the primary access node could obtain the mode determination mode by itself; therefore, the secondary access node could only comprise the modules of 1130, 1140 in such cases.

Figure 12:
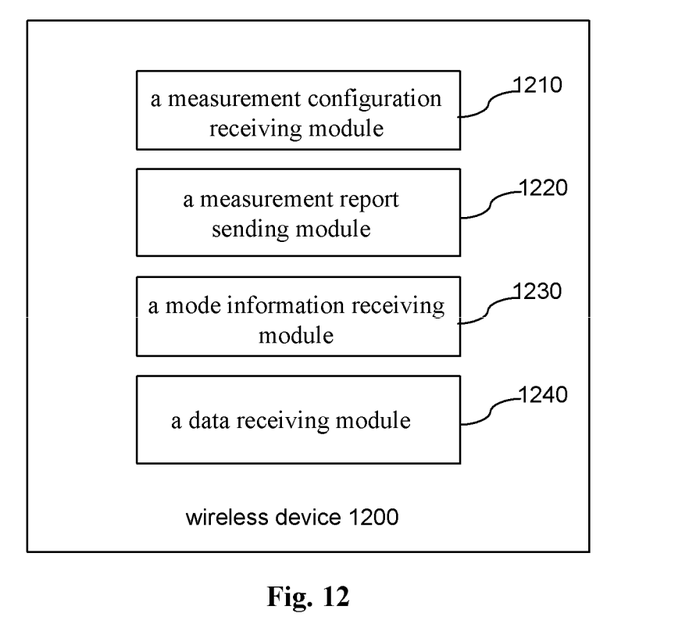
FIG. 12 schematically illustrates a block diagram of a wireless device according to one or more embodiments of the present invention.

FIG. 12 schematically illustrates a block diagram of a wireless device 1200 according to one or more embodiments. The wireless device 1200 may correspond to the wireless device described above in connection with FIGS. 2 to 8. As shown, the wireless device 1200 could comprise a measurement configuration receiving module 1210 for receiving a measurement configuration from the primary access node, a measurement report sending module 1220 for sending a measurement report to the primary access node, a mode information receiving module 1230 for receiving information about a data receiving mode from a primary access node and a data receiving module 1240 for receiving data according to the data receiving mode. It should be mentioned the above modules correspond to the steps of the method described above, and it is appreciated for the person skilled in the art that said modules could be PLD, FPGA, ASIC, and other implement mechanisms as software products, application specific firmware, hardware products and a combination thereof. It should be also mentioned that as discussed above in FIG. 8, the modules of 1210 and 1220 are only preferable in some embodiments, which means in certain cases the primary access node could obtain the mode determination mode from the secondary access node or by the primary access node itself; therefore, the wireless device could only comprise the modules of 1230, 1240 in such cases.

Figure 13:
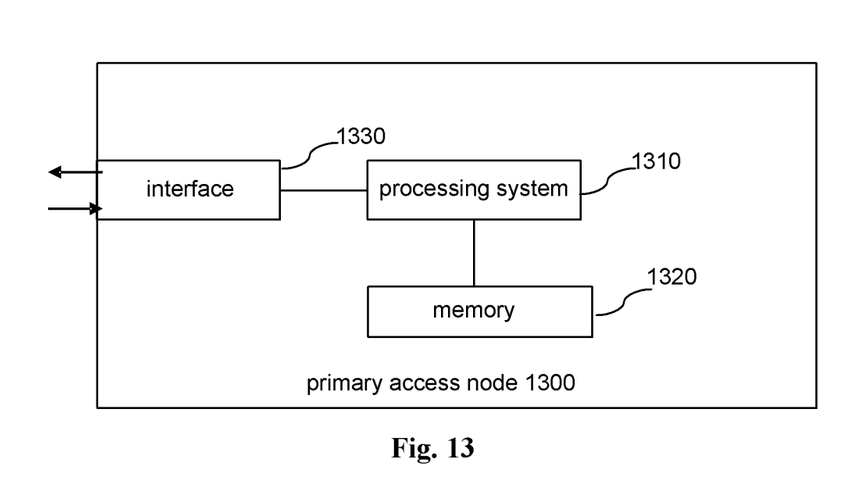
FIG. 13 schematically illustrates a block diagram of a primary access node according to one or more embodiments of the present invention.

FIG. 13 schematically illustrates a block diagram of a primary access node 1300 according to one or more embodiments. The primary access node 1300 may correspond to the primary access node described above in connection with FIGS. 2 to 8. As illustrated, the primary access node 1300 comprises a memory 1320 storing instructions therein and a processing system 1310 configured to execute the instructions, thereby causing the primary access node 1300 to perform the steps of the method illustrated in FIG. 5 or FIG. 6. For example, the processing system 1310 which includes one or more microprocessor or microcontrollers, as well as other digital hardware, which may include Digital Signal Processors (DSP), special-purpose digital logic, and the like. The processors may be configured to execute program code stored in memory. Instructions stored in memory includes program codes for executing one or more telecommunications and/or data communications protocols as well as program codes for carrying out one or more of the techniques described herein, in several embodiments. For example, the memory 1320 may include a Read Only Memory (ROM), e.g., a flash ROM, a Random Access Memory (RAM), e.g., a Dynamic RAM (DRAM) or Static RAM (SRAM), a mass storage, e.g., a hard disk or solid state disk, or the like. The memory includes suitably configured program code to be executed by the processing system so as to implement the above-described functionalities of the primary access node. In particular, the memory may include various program code modules for causing the primary access node to perform processes as described above, e.g., corresponding to the method steps of any one of FIG. 5-6. The primary access node may also comprise at least one interface 1330 for communicating with the wireless device, e.g. a wireless interface, and/or for communicating with the secondary access node, e.g. a wired or wireless interface. The interface could be coupled to the processing system. Information and data as described above in connection with the methods may be sent via the interface.

Figure 14:
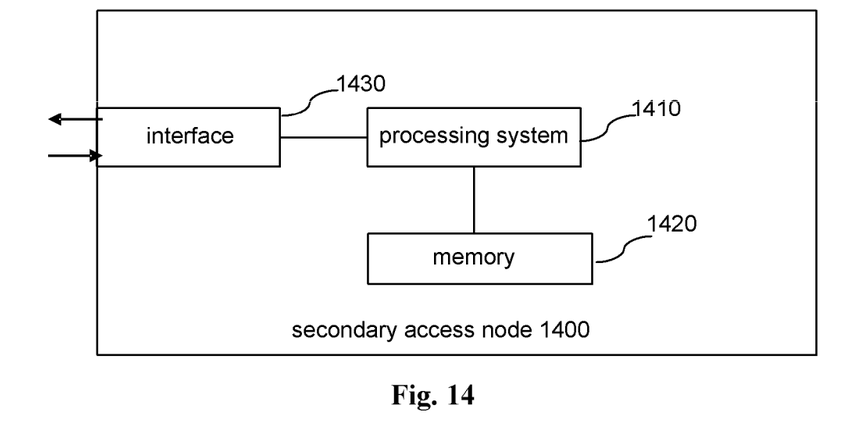
FIG. 14 schematically illustrates a block diagram of a secondary access node according to one or more embodiments of the present invention.

FIG. 14 schematically illustrates a block diagram of a secondary access node 1400 according to one or more embodiments. The secondary access node 1400 may correspond to the secondary access node described above in connection with FIGS. 2 to 8. As illustrated, the secondary access node 1400 comprises a memory 1420 storing instructions therein and a processing system 1410 configured to execute the instructions, thereby causing the secondary access node 1400 to perform the steps of the method illustrated in FIG. 7. For example, the processing system 1410 which includes one or more microprocessor or microcontrollers, as well as other digital hardware, which may include DSP, special-purpose digital logic, and the like. The processors may be configured to execute program code stored in memory. Instructions stored in memory includes program codes for executing one or more telecommunications and/or data communications protocols as well as program codes for carrying out one or more of the techniques described herein, in several embodiments. For example, the memory 1420 may include a ROM, e.g., a flash ROM, a RAM, e.g., a DRAM or SRAM, a mass storage, e.g., a hard disk or solid state disk, or the like. The memory 1420 includes suitably configured program code to be executed by the processing system so as to implement the above-described functionalities of the secondary access node. In particular, the memory may include various program code modules for causing the secondary access node to perform processes as described above, e.g., corresponding to the method steps of FIG. 7. The secondary access node 1400 may also comprise at least one interface 1430 for communicating with the wireless device, e.g. a wireless interface, and/or for communicating with the primary access node, e.g.

a wired or wireless interface. The interface could be coupled to the processing system. Information and data as described above in connection with the methods may be sent via the interface.

Figure 15:
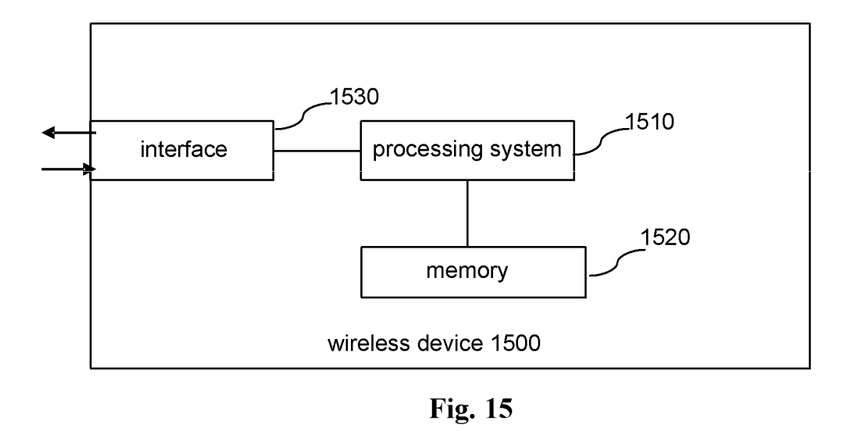
FIG. 15 schematically illustrates a block diagram of a wireless device according to one or more embodiments of the present invention.

FIG. 15 schematically illustrates a block diagram of a wireless device 1500 according to one or more embodiments. The wireless device 1500 may correspond to the wireless device described above in connection with FIGS. 2 to 8. As illustrated, the wireless device 1500 comprises a memory 1520 storing instructions therein and a processing system 1510 configured to execute the instructions, thereby causing the wireless device 1500 to perform the steps of the method illustrated in FIG. 8. For example, the processing system 1510 which includes one or more microprocessor or microcontrollers, as well as other digital hardware, which may include DSP, special-purpose digital logic, and the like. The processors may be configured to execute program code stored in memory. Instructions stored in memory includes program codes for executing one or more telecommunications and/or data communications protocols as well as program codes for carrying out one or more of the techniques described herein, in several embodiments. For example, the memory 1520 may include a ROM, e.g., a flash ROM, a RAM, e.g., a DRAM or SRAM, a mass storage, e.g., a hard disk or solid state disk, or the like. The memory includes suitably configured program code to be executed by the processing system so as to implement the above-described functionalities of the wireless device. In particular, the memory 1520 may include various program code modules for causing the wireless device to perform processes as described above, e.g., corresponding to the method steps of FIG. 8. The wireless device 1500 may also comprise at least one interface 1530 for communicating with the primary access node, e.g. a wireless interface, and/or for communicating with the secondary access node, e.g. a wired or wireless interface. The interface could be coupled to the processing system. Information and data as described above in connection with the methods may be sent via the interface.

It should be appreciated that the above concepts may be implemented by using correspondingly designed software to be executed by one or more processors of an existing device, or by using dedicated device hardware. Further, it should be noted that the illustrated nodes or devices may each be implemented as a single node or device or as a system of multiple interacting nodes or devices. The present disclosure may also be embodied in the computer program product which comprises all features capable of implementing the method as depicted herein and may implement the method when loaded to computer systems.

While the embodiments have been illustrated and described herein, it will be understood by those skilled in the art that various changes and modifications may be made, and equivalents may be substituted for elements thereof without departing from the true scope of the present technology. In addition, many modifications may be made to adapt to a particular situation and the teaching herein without departing from its central scope. Therefore it is intended that the present embodiments not be limited to the particular embodiment disclosed as the best mode contemplated for carrying out the present technology, but that the present embodiments include all embodiments falling within the scope of the appended claims.

The invention claimed is:

1. A method in a primary access node of a wireless network for configuring a data receiving mode for an intra-carrier, dual-connectivity communication, the method comprising:
sending a measurement configuration to a secondary access node and a wireless device;
receiving measurement reports from the secondary access node and the wireless device in response to sending the measurement configuration;
determining the data receiving mode based on one or more mode determination parameters obtained from the received measurement reports;
sending the determined data receiving mode to the secondary access node and the wireless device; and
sending data according to the determined data receiving mode to the wireless device.

2. The method according to claim 1, wherein determining the data receiving mode comprises configuring, as the data receiving mode, a Simultaneous Data Receiving (SDR) mode in which transmission resources scheduled by the primary access node and the secondary access node are overlapping or separate in a frequency domain and/or a time domain.

3. A non-transitory, computer-readable storage medium storing computer-executable instructions that, when executed by a processing system of a primary access node for a wireless communication network, configure the primary access node to perform operations corresponding to the method according to claim 1.

4. A primary access node for a wireless network, the primary access node comprising:
a memory storing computer-executable instructions therein; and
a processing system operably coupled to the memory and configured to execute the computer-executable instructions, thereby configuring the primary access node to perform operations corresponding to the method according to claim 1.

5. The method according to claim 1, wherein determining the data receiving mode comprises selecting the data receiving mode as a Simultaneous Data Receiving (SDR) mode when the one or more mode determination parameters comprises a wireless device capability, and wherein the wireless device capability indicates that the wireless device performs inter-cell interference cancellation.

6. The method according to claim 1, wherein determining the data receiving mode comprises adaptively switching the data receiving mode among Time Divided Receiving (TDR) mode, Frequency Divided Receiving (FDR) mode, or Simultaneous Data Receiving (SDR) mode according to the one or more mode determination parameters.

7. A method in a secondary access node of a wireless network for an intra-carrier dual connectivity communication, the method comprising:
receiving a measurement configuration from a primary access node;
sending a measurement report to the primary access node in response to receiving the measurement configuration, wherein the measurement report comprises one or more mode determination parameters;
receiving a data receiving mode from the primary access node wherein the data receiving mode is based on the one or more mode determination parameters; and
sending data according to the data receiving mode to a wireless device.

8. A non-transitory, computer-readable storage medium storing computer-executable instructions that, when executed by a processing system of a secondary access node for a wireless communication network, configure the secondary access node to perform operations corresponding to the method according to claim 7.

9. A secondary access node for a wireless network, the secondary access node comprising:
a memory storing computer-executable instructions therein; and
a processing system operably coupled to the memory and configured to execute the computer-executable instructions, thereby configuring the secondary access node to perform operations corresponding to the method of claim 7.

10. A method in a wireless device connected to a wireless network for an intra-carrier dual connectivity communication, the method comprising:
receiving a measurement configuration from a primary access node;
sending a measurement report to the primary access node in response to receiving the measurement configuration, wherein the measurement report comprises one or more mode determination parameters;
receiving a data receiving mode from the primary access node wherein the data receiving mode is based on the one or more mode determination parameters; and
receiving data according to the data receiving mode.

11. The method according to claim 10, wherein the data receiving mode is one of:
Time Divided Receiving (TDR) mode, in which transmission resources scheduled by the primary access node and a secondary access node are separate in a time domain;
Frequency Divided Receiving (FDR) mode, in which the transmission resources scheduled by the primary access node and the secondary access node are separate in a frequency domain; and
Simultaneous Data Receiving (SDR) mode, in which the transmission resources scheduled by the primary access node and the secondary access node are overlapping or separate in the frequency domain and/or the time domain.

12. The method according to claim 10, wherein the one or more mode determination parameters comprises a wireless device capability.

13. The method according to claim 10, wherein the one or more mode determination parameters comprises a timing difference between a primary access node connection and a secondary access node connection.

14. The method according to claim 10, wherein the one or more mode determination parameters comprises a Quality of Service (QoS) requirement of the wireless device.

15. The method according to claim 10, wherein the one or more mode determination parameters comprises a radio quality of a primary access node connection and a radio quality of a secondary access node connection.

16. The method according to claim 10, wherein the one or more mode determination parameters comprises a battery life status of the wireless device.

17. The method according to claim 10, wherein the one or more mode determination parameters comprises a hybrid automatic repeat request (HARQ) feedback of a primary access node connection and a HARQ feedback of a secondary access node connection.

18. A non-transitory, computer-readable storage medium storing instructions that, when executed by a processing system of a wireless device adapted to be connected to a wireless network, configure the wireless device to perform the operations corresponding to the method according to claim 10.

19. A wireless device adapted to be connected to a wireless network, the wireless device comprising:
a memory storing computer-executable instructions therein; and
a processing system operably coupled to the memory and configured to execute the computer-executable instructions, thereby configuring the wireless device to perform operations corresponding to the method according to claim 10.

* * * * *